United States Patent
Darzinskis

[19]

[11] Patent Number: 5,884,463
[45] Date of Patent: Mar. 23, 1999

[54] CONVERTIBLE MOWER WITH ROTARY DISC MECHANISM

[76] Inventor: Kaz Darzinskis, 8115 Highland Ave., Downers Grove, Ill. 60516

[21] Appl. No.: 986,482

[22] Filed: Dec. 8, 1997

[51] Int. Cl.⁶ .............................. A01D 87/10; A01D 34/66
[52] U.S. Cl. .............................. 56/13.4; 56/13.8; 56/17.5; 56/255; 56/DIG. 20
[58] Field of Search ..................................... 56/13.4, 12.8, 56/13.6, 13.7, 13.8, 17.5, 16.9, 255, 295, DIG. 17, DIG. 20

[56] References Cited

U.S. PATENT DOCUMENTS

| | | | |
|---|---|---|---|
| 3,049,854 | 8/1962 | Denney . | |
| 3,118,267 | 1/1964 | Shaw . | |
| 4,083,166 | 4/1978 | Haas | 56/13.7 |
| 4,161,096 | 7/1979 | Biberger | 56/13.4 |
| 4,905,461 | 3/1990 | Heuer | 56/13.4 |
| 5,035,107 | 7/1991 | Scarborough | 56/13.6 |
| 5,142,851 | 9/1992 | Lydy et al. | 56/13.4 |
| 5,483,790 | 1/1996 | Kuhn et al. | 56/17.5 |
| 5,560,189 | 10/1996 | DeVillier et al. | 56/13.6 |

Primary Examiner—Heather Shackelford

[57] ABSTRACT

A mowing mechanism having a spindle rotatively driven by a power source, a blade having a radially inner portion coupled for rotation with the spindle and a radially outer portion for cutting vegetation, a housing within which the blade rotates, and a disc coupled for rotation with the spindle and operatively carried within the housing for rotation with the blade and spaced above the blade. The inner and outer portions of the disc serve to channel air and clippings to the inner portion of the blade. The rotating disc prevents accumulation of the grass clippings beneath the disc and housing, and enhances airflow within the housing due to viscous drag or friction between the disc and the air within the housing. Deflectors carried by the disc are designed to further enhance airflows and generally deflect clippings back toward the inner portion of the blade for mulching. A door hingedly fixed on the housing is provided a horizontal roof member extending over the top of part of the housing can be opened to form a discharge outlet. The combination of the readily removable or replaceable disc and a door capable of being opened serve to conveniently convert the mower from mulching mode to an alternate discharge mode. A roller in a cutout in the housing serves to stiffen the disc and to power a string trimmer fixed outside of the housing.

11 Claims, 5 Drawing Sheets

CONVERTIBLE MOWER WITH ROTARY DISC MECHANISM

BACKGROUND-FIELD OF INVENTION

This invention relates to mowers that can be converted from mulching to discharge grass cutting mode and that can optionally provide power to a string trimmer outside the mower deck.

BACKGROUND-DESCRIPTION OF PRIOR ART

Typical mowing machines include a housing within which a blade rotates to cut vegetation such as grass, the housing serving as a guard and as a means to direct the flow of clippings and air. The blade is typically fixed to a spindle rotatively driven by a power source such as an engine. Many mowers provide a discharge outlet in the housing through which clippings exit the housing. Other mowers mulch the clippings by preventing them from exiting the housing. These mulching mowers block the discharge outlet, thereby cutting and re-cutting the clippings within the housing until they fall into the lawn in relatively small fragments.

Mowers according to the prior art typically tend to accumulate grass clippings which stick to the underside of the deck. This accumulation of clippings can be caused by mowing wet grass, and also due to the fact that clippings can become sticky when cut. Excessive accumulation of clippings within the housing can cause clogging near or in the discharge outlet. The clippings can even build-up to a point where rotation of the blade or spindle is hindered. Furthermore, the accumulated clippings stuck to the underside of the housing can create resistance to the flow of air and clippings within the housing. The insufficient flow of air through the housing can result in unsightly windrowing or clumping of grass clippings on the lawn. Some mowers provide extra large wings on the mower blade for directing a larger amount of air out through the deck. However, larger wings tend to undesirably increase the amount of noise generated by the mower.

Mulching mowers tend to experience particularly large accumulation of clippings beneath their mower decks. Mulching mowers cut and re-cut the clippings into small fragments which can more readily adhere to surfaces within the housing. Also, since mulching mowers generally do not provide a discharge outlet for clippings, the clippings recirculate and are suspended within the deck for a longer period of time, which gives the clippings more opportunity to adhere to the underside of the deck.

On the surface to be cut, the area covered by the housing of such mowers is necessarily larger than the area covered by the cutting areas of the blade. As a result, mowers with housings do not cut vegetation near solid objects such as fences and other fixed borders.

OBJECTS AND ADVANTAGES

It would therefore be desirable to provide a mowing mechanism which generally hinders clippings from sticking to or otherwise accumulating on the underside of the deck. It would also be desirable for non-mulching mowers to maintain a relatively large volume of air and clippings being expelled through the discharge outlet. Furthermore, it would be desirable to provide a mower which generates a relatively low amount of noise during operation.

Furthermore, it would be desireable to provide a mower that can easily and conveniently be changed from conventional or discharge mode to mulching mode. Finally, it would be desireable to provide a mower with a trimmer capable of trimming vegetation outside of the housing.

SUMMARY OF THE INVENTION

The preferred embodiment of the present invention provides a disc positioned above a mower blade within a housing. The blade includes a cutting edge and a trailing upturned wing at the radially outer portion of the blade for generating airflows and updrafts within the housing. The disc has deflectors at an outer portion spaced generally above the upturned wing of the blade, serving to deflect air and clippings inward. The inner portion of the disc has downward wings to generate downward air flows (toward the blade). The upturned wings of the blade together with the deflectors of the disc serve to confine air and clippings flowing within the housing to an area proximate the inner cutting portion of the blade, and enhance the recutting and discharge of clippings from the housing. The higher airflows created by the rotating disc allow a smaller wing to be utilized on the blade, thereby decreasing the noise generated by the mower and decreasing the flattening of the grass to be cut, as occurs on mowing machines that create downward air flows by means of downturned wings on the blades.

Centrifugal forces imparted to clippings by the disc generally prevent the clippings from accumulating on the underside of the disc. Air inlets are formed in the skirt of the housing to always allow sufficient flow of air to reach the deflectors in order to enhance the airflow within the housing during mulching operations and to enhance the downward airflow toward the inner cutting edge of the blade.

Within a cutout in the skirt of the housing, a roller on a vertical axis stabilizes the disc and provides rotative energy to a string trimmer mounted outside of the housing.

Drawing Reference Numbers

10 Housing, mower
12 Top wall of housing
14 Skirt (side wall) of housing
16 Pulley, spindle
18 Spindle
20 Bearings
22 Spindle housing
24 Inner portion of blade
26 Blade
28 Lower portion of spindle
30 Outer end of blade
32 Cutting edge of blade
34 Trailing wing
36 Disc
38 shoulder portion
40 Bolt
42 Blade washer
44
46 Roller, power
48
50 Disc, radially outer portion
52 Disc, radially inner portion
54
56 Hinge, spring loaded
58 Wings on inner portion of disc
59
60 Deflector tabs on outer portion of disc
62 Holes in disc
63 Leading edge
64 Taper at outer part of disc
65
66 Holes in housing
67 Disc washer
68 Spacer, blade
69 Roller -continued Drawing Reference Numbers 70 Cutout in skirt
71 Vertical shaft
72 V-shaped notch in roller
73 Housing, shaft
74 Leaf spring
75 Top of shield
76 Shield
77 Side of shield
78 Side of shield
79 Side of shield
80 skirt cut out
82 Door
84 Hinge, door
86 clip
88 bend in door
90 roof member
92 flange of roof member
94 Discharge outlet
96
98 String trimmer
99
100
110 housing, string trimmer
111–139 unused
140 trimmer shaft
142 trimmer hub
144 line, trimmer
146 roller, trimmer receiving
148 shaft
150 housing, shaft
152
154 lever
156 hole in lever

DESCRIPTION OF THE PREFERRED EMBODIMENT

Figure 1:
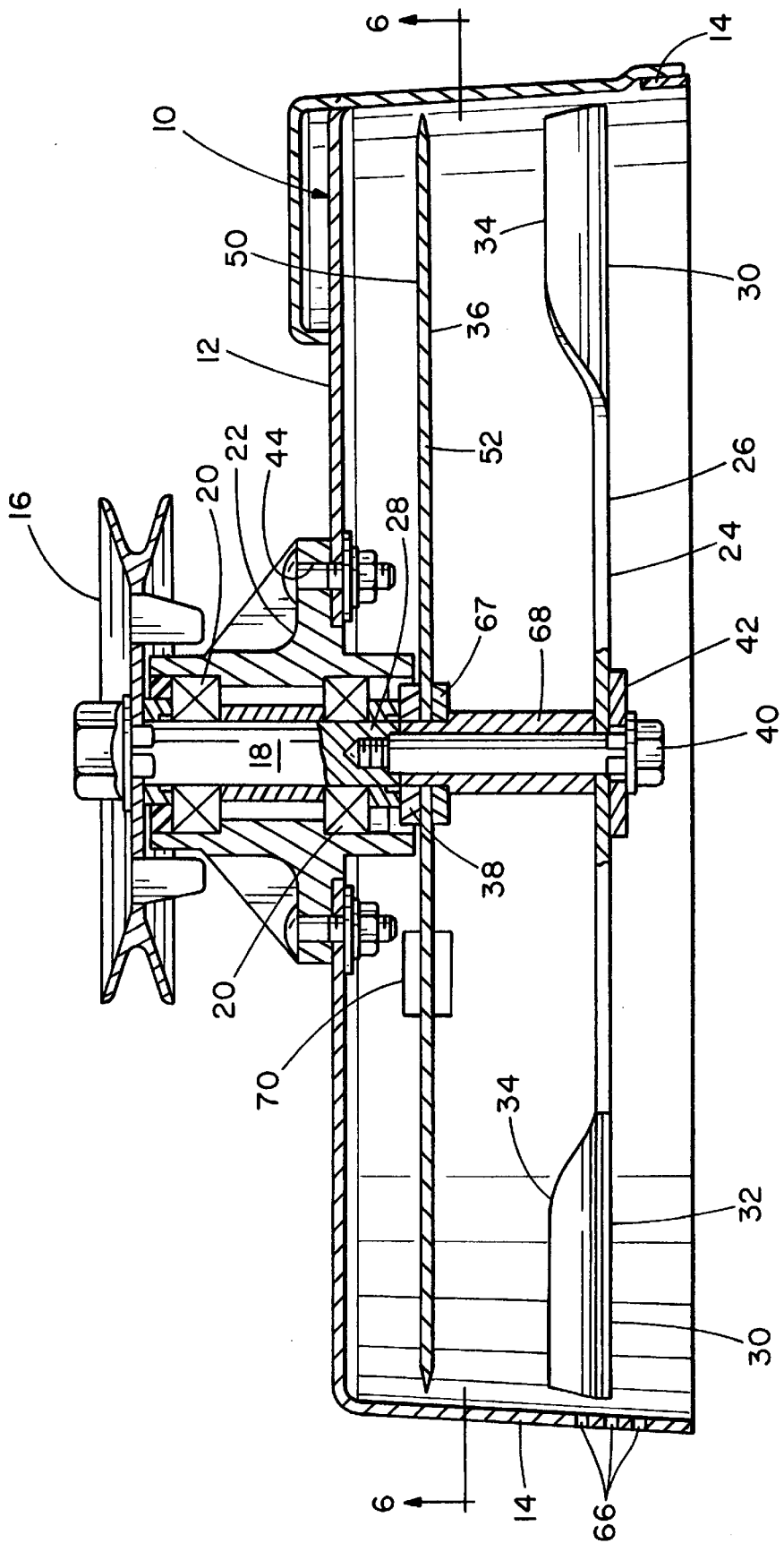
FIG. 1 is a side view of the housing 10, power transmission means for the spindle 18, blade, and disc 36 of the preferred embodiment of the present invention.

Referring now to FIG. 1, there is shown the preferred embodiment of the present invention. A housing 10 having a top wall 12 and downwardly extending skirt 14 is provided as part of a deck which can be coupled with a tractor vehicle having a power source. The vehicle's power source operatively drives a belt which engages a pulley 16. A spindle 18 is fixed for rotation with the pulley 16 and is operatively supported by bearings 20 within a spindle housing 22. The spindle housing 22 is bolted through holes 44 in the top wall 12 to the housing 10. The radially inner portion 24 of a mower blade 26 is coupled with the lower end portion 28 of the spindle 18. The radially outer end portion 30 of the blade 26 includes a trailing wing portion 34 for impelling air and clippings upwardly. The blade 26 includes a cutting edge 32 for mowing vegetation along its entire leading edge except for the radially inner portion 24 that is adjacent to the blade washer 42.

A number of holes 66 are provided in the skirt 14 of the housing 10 to admit additional air.

The preferred embodiment provides a disc member 36 which is coupled for rotation with the spindle 18 and blade 26 within the housing 10. The disc 36 is positioned between the top surface of the disc washer 67 and a shoulder portion 38 defined by the spindle 18, and the disc 36 generally conforms to the contour of the top wall 12 of the housing 10. A bolt 40 is received by the lower end portion 28 of the spindle 18 and presses a blade washer 42 upwardly against the blade 26 and blade spacer 68. The blade spacer presses upwardly against the disc washer when the bolt 40 is tightened. The bolt 40 thereby presses the blade washer 42, blade 26 and disc 36 and blade spacer 68 and disc washer 67 upwardly against the shoulder portion 38. The blade 26 and disc 36 are thereby fixed for rotation with the spindle 18. Other means for coupling the disc 36 or blade 26 to the spindle 18 could also be employed, such as by welding the disc 36 to the disc spacer 68 and disc washer 67, or by providing an irregular shaped opening such as a hex in the disc 36 which mates with a shape formed in the bolt 40.

FIG. 1 shows a single spindle mulching mower deck, but the present invention is also usable with housings other than that shown in FIG. 1, such as multiple spindle decks and decks for riding mowers and single spindle mowers powered directly by a motor.

Figure 2:
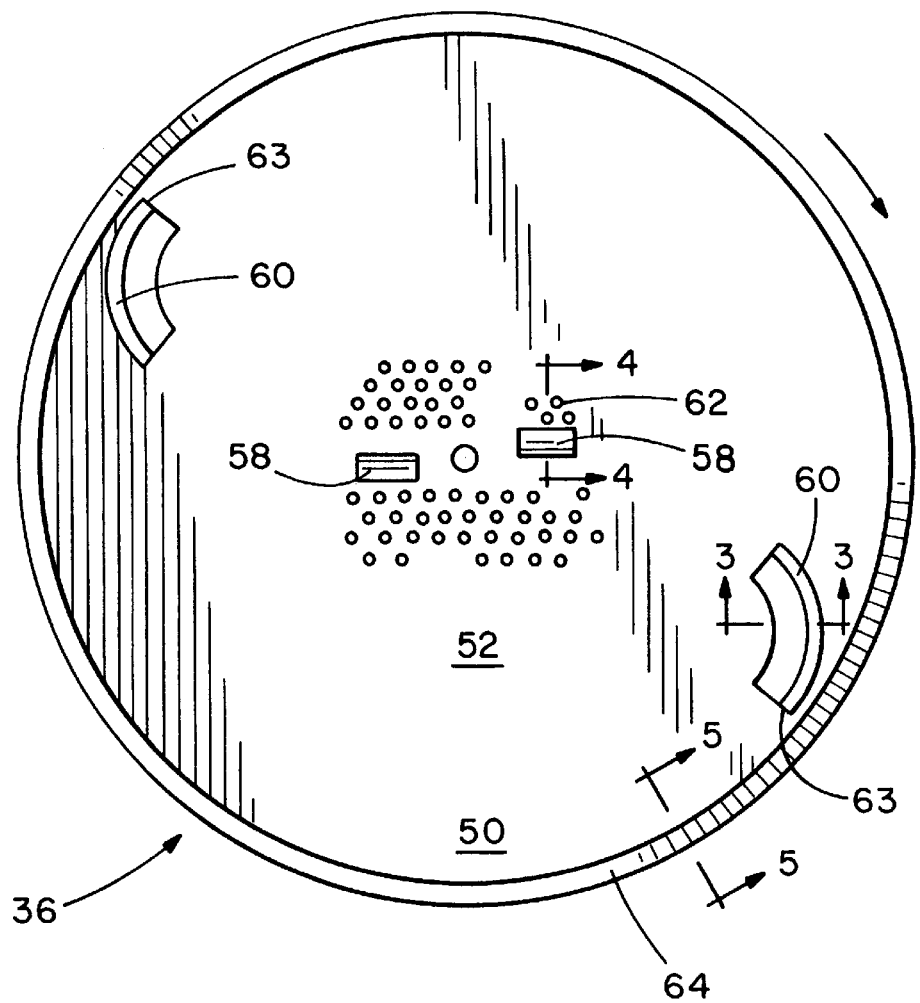
FIG. 2 is an underside view of the flat disc 36 of present invention.
Figure 3:
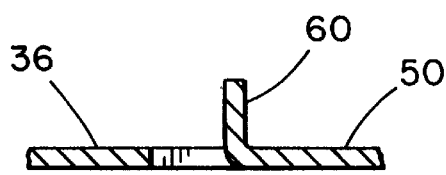
FIG. 3 is a sectional view of the deflector tabs 60 of the disc 36 as shown in FIG.2.

The disc 36 shown in FIG. 2 includes punched deflector tabs 60 extending downwardly from the generally outer portion 50 of the disc 36, although the deflector tabs 60 could also be welded or otherwise fixed to the underside of the disc 36. The deflector tabs 60, shown in a sectional view in FIG. 3, extend downwardly from the disc 36 and are designed to direct or otherwise deflect air and clippings toward the inner portion 24 of the blade 26 and inner portion 52 of the disc 36 thereby enhancing the deck's mulching capability by forcing clippings back into the inner portion 24 of the blade 26 for re-cutting. Said deflector tabs 60 have, in reference to the rotation of the disc, a leading edge portion 63 which is tangent to the circle formed by the radius of the disc at each point of the leading edge 63, said deflector tabs 60 having behind the leading edge 63 a curvilinear portion each point of which is closer to the center of the disc than the leading edge portion.

FIG. 2 shows the inner portion 52 of the disc contains wings 58 extending downwardly from the disc 36. These wings 58 on the inner portion 52 of the disc 36 are also intended to enhance airflow and mulching within the housing 10. Though here shown as punched tabs, these could also be fixed on the underside of the disc 36 by means of welding, rivets, screws etc.

Figure 4:
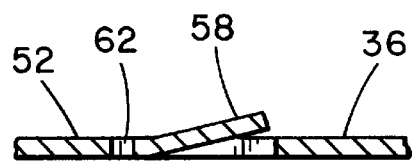
FIG. 4 is a sectional view of the wings 58 of the disc 36 shown in FIG.2.

FIG. 4 shows a sectional view of the wings 58. These wings 58 extend downwardly from the disc 36 at less than 90 degrees and thus serve to form a downdraft of air and clippings toward the blade 26. The wings 58 are provided to direct air and clippings in the direction of blade rotation and downwardly into the blade 26 for re-cutting.

FIG. 2 shows a disc 36 having holes 62 formed in the inner 52 portion thereof and which are intended to direct air and clippings in the direction of blade rotation and to deflect air and clippings generally downwardly for re-cutting by the blade 26. The openings or gaps 62 also decrease the mass of the rotating disc 36 such that the inertia of the disc 36 will be decreased. The relatively low inertia of the rotating disc 36 is intended to extend the operating life of the blade clutch which initiates blade rotation and which halts the blade 26 when blade rotation must be quickly stopped.

The discs 36 could be manufactured from plastic or composite materials such that the taper 64, wings 58, deflector tabs 60 or openings 62 could be molded into the disc 36 during its manufacture.

Figure 5:
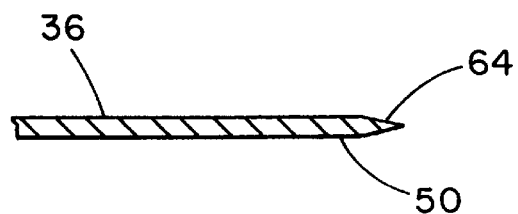
FIG. 5 is a sectional view of the outer radial edge of the disc 36 shown in FIG.2.

As shown in FIG. 5, the disc 36 includes a taper 64 formed at the outer radial edge of the disc 36.

Figure 6:
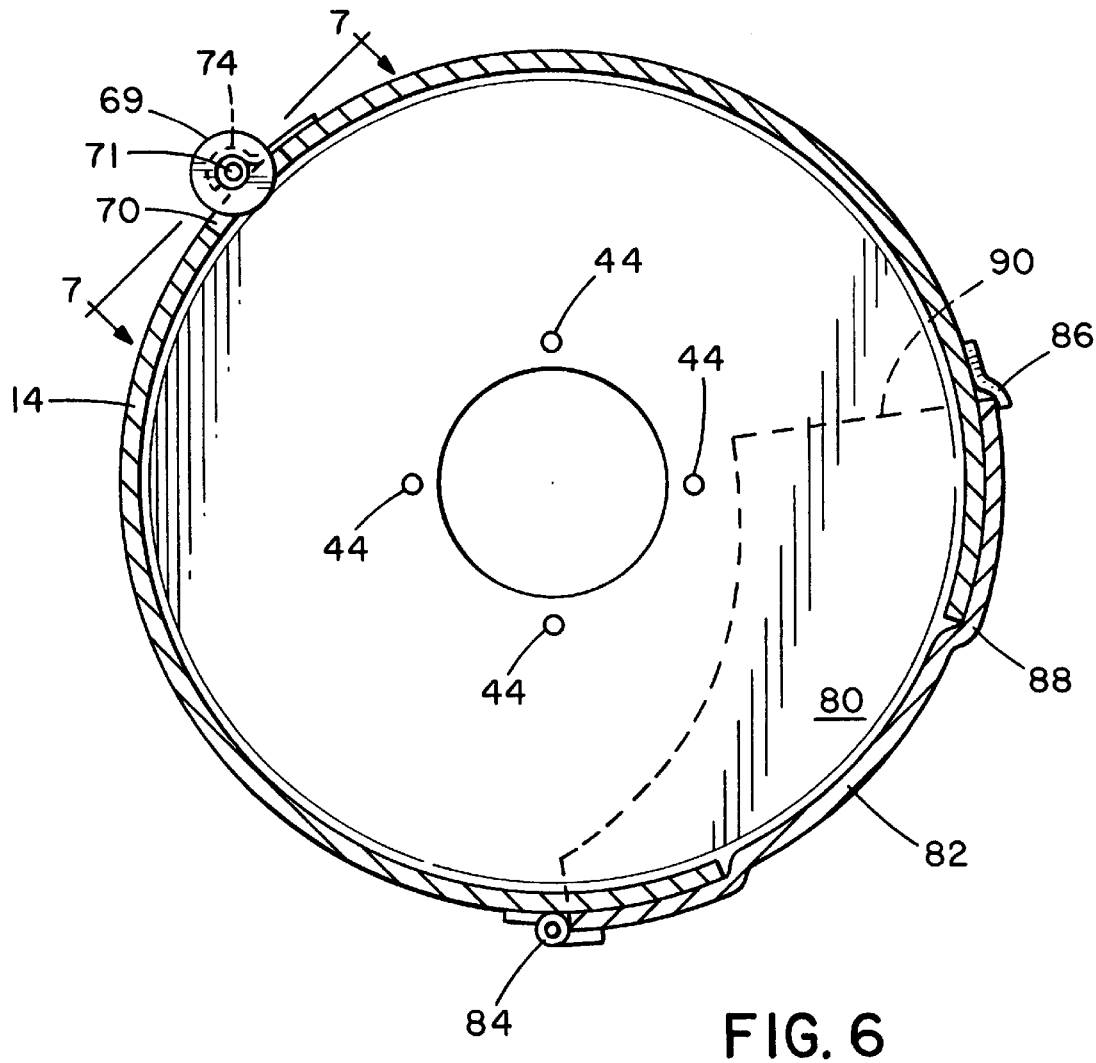
FIG. 6 is an underside sectional view of the housing 10 including a door 82 and a roller 69 partly inside the housing.
Figure 7:
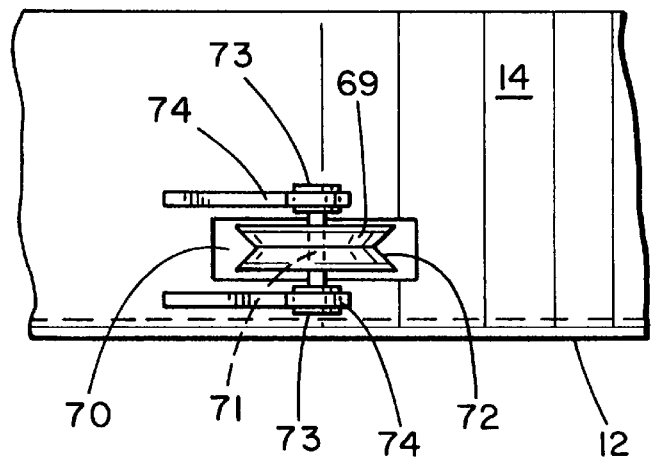
FIG. 7 is a sectional view of a part of the skirt 14 of the housing 10 containing a roller 69.

As shown in FIG. 6 and FIG. 7, a roller 69 with a V-shaped notch 72 is provided in a cutout 70 in the downwardly extending skirt 14 of the housing 10. The V-shaped notch 72 in the roller 72 is of a shape and size so as to mate with the taper 64 at the outer radial edge of the disc 36.

Referring to FIG. 7, the roller 69 is symmetrical around a vertical shaft 71 supported by shaft housings 73. Each housing 73 is urged against the sidewall 14 of the housing by a leaf spring 74 so as to press the roller 69 against the outer radial edge of the disc 36 and against the taper 64. Thus, the roller 69 will serve to resist vertical motion of the disc 36 due to unusually large mass of clippings hitting a portion of the disc 36, and the disc can therefore be made of thinner, lighter cross section.

Referring to FIG. 6, one portion of the skirt 14 has a skirt cutout 80. The cutout 80 is sized to accept a portion of a door 82 the major part of which is the same size and curvature as the skirt cutout 80. When the door 82 is closed, it occupies the space of the skirt cutout 80. In mulching mode, the skirt 14 remains circular and essentially continuous, because the door 82 is kept closed. A clip 86 keeps the door 82 closed during mulching operations. The door is fixed on one end to the skirt 14 by a hinge 84. The end of the door opposite the hinged end, which is downstream from the hinged end, is held closed against the skirt 14 by means of the aforementioned clip 86. Near the downstream end of the door 82, a bend 88 is provided in the door 82 so as to mate with the skirt 14 at its junction with the cutout 80 and thus provide an aerodynamically clean inner radial surface of the skirt 14 when the door 82 is closed.

Figure 9:
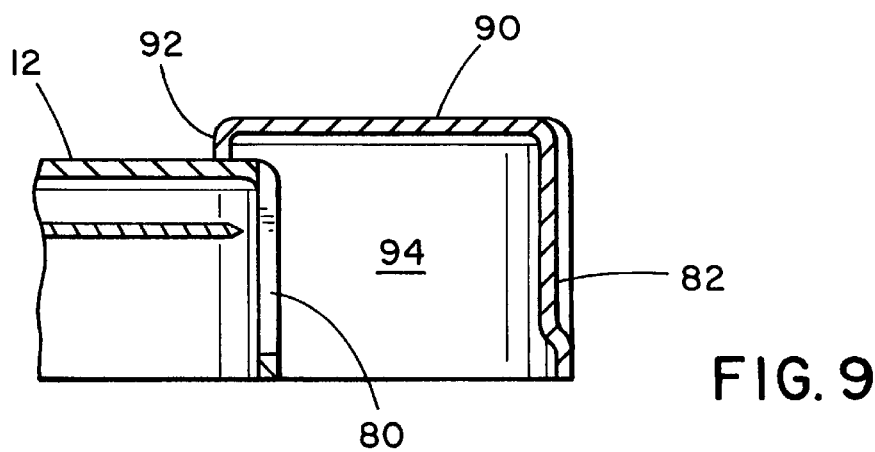
FIG. 9 is a sectional view of the do or 82, cover guard 90, and housing 12 shown in FIG. 8.

As as shown in FIG. 9, at the top of the door, a roof member 90 is fixed perpendicular to the door and essentially parallel to the top wall of the housing 12. The roof member 90 at its extremity away from the bend 88 in the door 82 has a flange 92, the end of which abuts the top wall of the housing 12. When the door 82 is in the open position, as shown in FIG. 9, the combination of the door 82 and roof member 90 and cutout 80 in the skirt 14 serve to form a discharge outlet 94. The combination of the door 82 and roof member 90 also serve as a barrier guard against accidental contact with the blade 26. Hardware, not shown, may be attached to the door 82 and/or roof member 90 and/or skirt 14 to attach a bag or other clippings collection means to the mower or to facilitate the transfer of clippings and moving air to another housing containing another blade etc.

Figure 8:
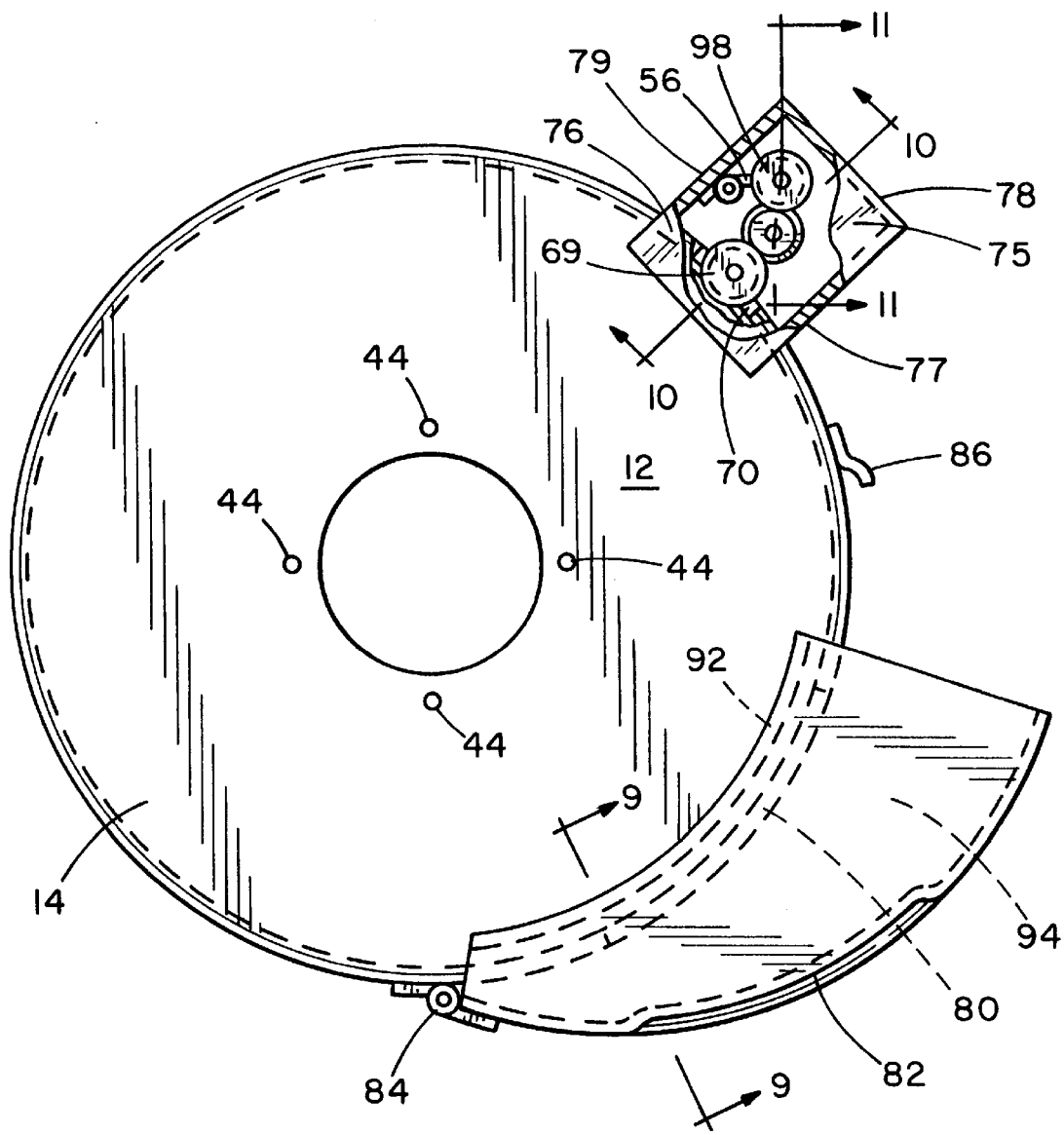
FIG. 8 is a plan view of the housing 12 which includes a door 82 and shield 76 for a string trimmer 98.

Referring to FIG. 8, a shield 76 is provided near one of the cutouts 70 in the skirt 14 to enclose the roller 69 and string trimmer 98. Referring to FIG. 8, the shield 76 has a top member 75 which is fixed to and abuts the top of the housing 12 and cantilevers out over the string trimmer 98. The shield has side members 77,78,79 which together with the top member 75 and part of the skirt 14 enclose all sides of the string trimmer 98 except the bottom. A stationary end of a spring loaded hinge 56 is fixed to a side member 79 of the shield 76. The moving end of the hinge 56 is fixed to the housing 110 of the string trimmer 98.

Figure 11:
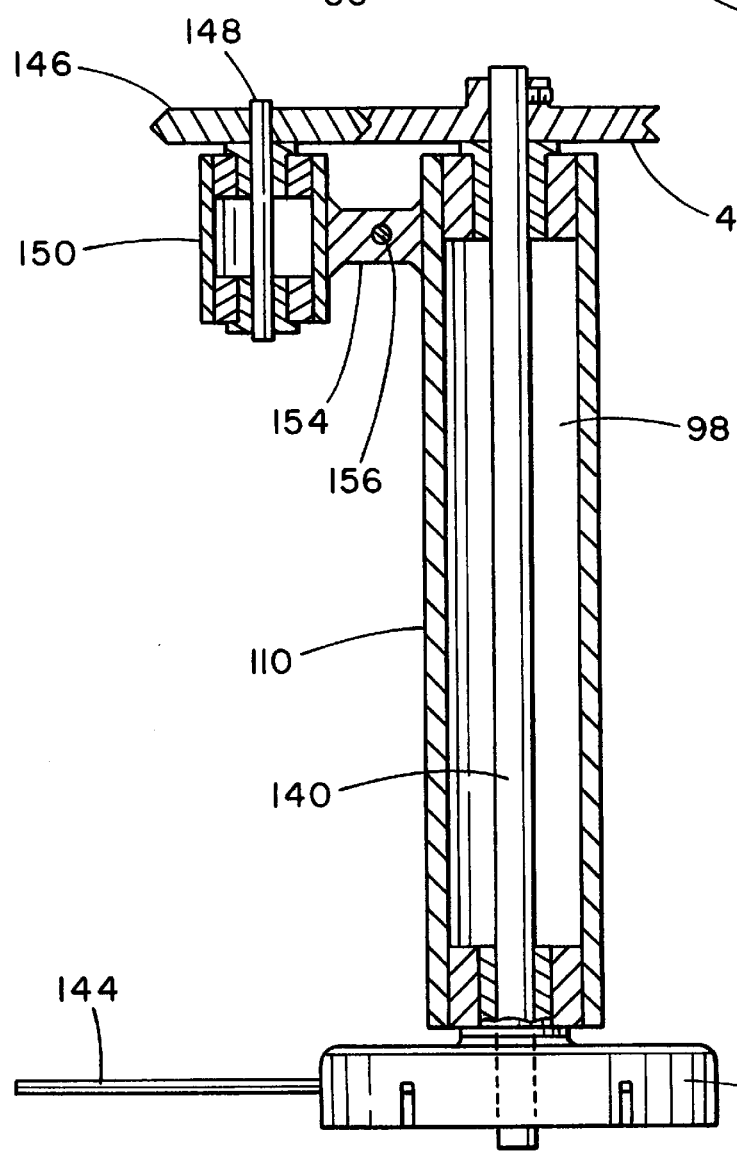
FIG. 11 is a sectional view of the string trimmer 98 shown in FIG. 8.

As shown in FIG. 11, the string trimmer 98 comprises a trimmer shaft 140 rotatively supported by bearings inside a housing 110 of the string trimmer 98. A hub 142 mounted to a lower end of the trimmer shaft 140 supports monofilament line 144 such that rotation of the hub 142 will rotate the monofilament line 144 within a horizontal plane. An arrangement of the monofilament line 144 is provided to allow the monofilament line 144 under centrifugal force exerted upon the monofilament line to extend beyond the sides 77,78,79 of the shield 76. Clear of the shield 76, the monofilament line can contact and cut grass next to a solid object.

A trimmer receiving roller 146 is mounted on a shaft 148 rotatably supported within a housing 150, which is fixed to the housing 110 of the string trimmer 98 by means of a lever 154.

A power roller 46 is mounted to an upper end of the trimmer shaft 140. The roller is so positioned and of such size that it abuts the trimmer receiving roller 146, said roller having in part an elastomeric surface. A hole 156 is provided in the lever 154 to facilitate attachment of a cable that this threaded through the mower to the operator's position. By applying force to a cable the operator can move the string trimmer 98 against the force of the spring loaded hinge 56.

Figure 10:
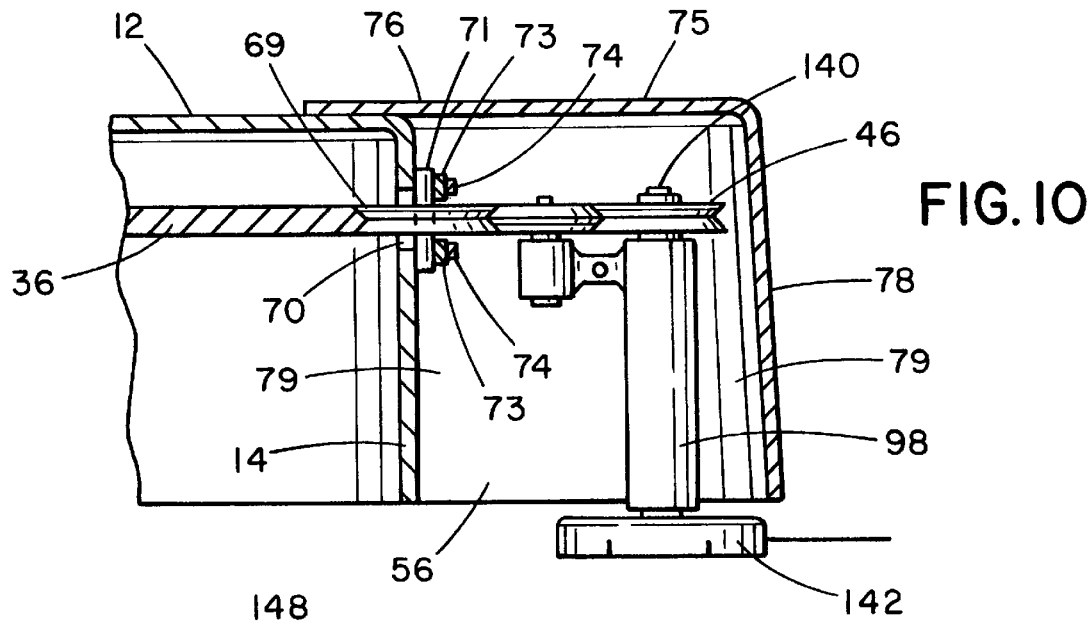
FIG. 10 is a sectional view of the shield 76 and part of the string trimmer 98 shown in FIG. 8.

When the aforementioned cable is appropriately pulled and the string trimmer 98 moves, the trimmer receiving roller 146 contacts the roller 69 in the cutout 70 in the skirt 14, as is best illustrated in FIG. 10. The cable thus acts as a clutch actuator that controls whether the hub 142 rotates.

OPERATION OF INVENTION

Next, the operation of the preferred embodiment will be discussed. In mulching mode the door 82 is closed and there is no discharge outlet in that the clippings fall mainly under the blade 26. As the blade 26 rotates within the housing 10 grass and vegetation are cut mainly by the leading cutting edge 32 of the outer portion 30 of the blade 26 due to the fact that the blade 26 velocity is great compared to the speed of the housing 10 in the mowing direction. The trailing wing portion 34 impels grass clippings generally upwardly and creates an updraft as it rotates within the housing 10. The air and clippings also are imparted a velocity component in the direction of the travel of the blade 26, because of the blade 26 motion and blade wing 34 motion and because of the motion of the disc 36, which acts to enhance the velocity of the air and clippings within the housing 10. Viscous drag or friction between the underside of the disc 36 and the air within the housing will tend to increase the speed of the air, as do the surface features of the disc 36, namely the downturned wings 58, the holes 62 and the deflectors 60. Some of the grass clippings which are moving upwardly in the housing 10 contact the disc 36 which is rotating at the same speed as the blade 26. However, the clippings do not tend to stick or accumulate on the underside of the disc 36 since it is moving generally with the blade 26. The centrifugal force of the rotating disc 36 is imparted to the clippings contacting the disc 36 and acts to initially throw most of the clippings outwardly and generally prevent clippings from sticking to the underside of the disc 36. The deflector tabs 60 at the outer portion 50 of the disc propel air and clippings inwardly toward the inner portion 52 of the disc 36, where downwardly extending wings 58 force air and clippings to the blade 26 for recutting and discharge them to the mowed surface. Viscous drag and centrifugal force which is applied to the air between the disc 36 and the skirt 14 of the housing 10 will not create a partial vaccuum in the area close to the junction of the skirt 14 and top wall 12 of the housing 10, thus lowering the efficiency of the deflectors 60 because the updraft of new air caused by the upturned wings 34 on the blade 26. Alternatively, in conventional discharge mode, the door 82 is opened to create a discharge outlet 94, and the disc 36 is removed from the spindle 18 by removing the bolt 40 and manually pulling the roller 69 away from the outer edge of the disc. The blade does not have to be replaced, but may be replaced with a blade with larger upturned wings 34.

In either case, the blade 26 and especially the blade wings 34 act to create a concentrated area of relatively high speed air and clippings above the ends of the blade 26. This higher energy air and clippings travel around the housing 10 until discharged through the discharge outlet 94 into a collection hopper or onto the mowed surface or into another deck housing. The resulting high airflow within the housing 10 generally enhances the discharge of clippings through the discharge outlet 94.

The small amount of grass cut by the interior portion 24 of the blade 26 is imparted centrifugal force by which much of that grass also travels to the area of relatively high speed air whereupon it is also expelled through the discharge outlet 94.

The relatively high airflows which result from the use of the disc 36 according to the present invention generally allow a relatively small trailing wing section 34 to be utilized on the blade 26. The noise level of the blade 26, which is largely attributable to the blade's wing portion 34, is thereby generally reduced.

To convert from the mulching mode to conventional discharge mode, an alternative to replacing the blade 26 with blades with larger wing portions, as above described, is to replace the disc 36 with an alternative flat disc that has deflectors that propel clippings and air away from the inward portion of the blade 24 and toward the outer portion of the blade 30. Such alternative disc deflectors are disclosed in U.S. Pat. No. 5,483,790, particularly in FIGS. 5–11 thereof. It should be understood that the alternative disc deflectors therein disclosed are on a U-shaped disc, unlike the flat disc 36 herein disclosed. Using one of the alternative disc deflectors on a flat disc as herein disclosed, the component of the velocity of the clippings and air toward the skirt 14 of the housing 10 will be enhanced, thus enhancing the flow of air and clippings through the housing 10 and through the discharge outlet 94. The radial outer portion 50 of the disc 36 as shown in FIG. 1 terminates at a location substantially above the blade 26. A gap is thereby established between the blade 26 and the disc 36 through which clippings and air may flow to exit the housing 10 through the discharge outlet 94.

The flat disc 36 with alternative disc deflectors can be provided a taper 64 at the outer radial edge, as is herein shown, so the disc can mate with a roller 69 in the skirt 14 of the housing 10.

When the housing 10 is close to the ground to mow a surface that has short remaining grass, there may be a shortage of air entering the housing 10. If little air is flowing into the housing 10 there is little or no updraft for lifting the grass which is about to be cut, which in turn could cause poor cut quality. The air inlets or openings 66 in the housing 10 shown in FIG. 1 are designed to allow additional air to enter the housing 10 for creating an updraft for the beneficial lifting of the grass which is about to be cut.

When a fixed obstruction such as a fence is encountered, the application of force by the operator to a cable causes the string trimmer 98 and trimmer receiving roller 146 to move and thereby come in contact with a roller 69 which is rotatively driven by the disc 36, causing the string trimmer shaft 140 and hub 142 to rotate.

I claim:

1. In a power mower, the combination of a housing having a top wall and a depending skirt joined to said top wall, a source of power for the mower, a vertical spindle operatively connected near its upper end to said source of power and extending downwardly into said housing, a blade fixed to the lower portion of said spindle and rotated thereby in a horizontal plane within the lower portion of said housing, and a disc fixed to an intermediate part of said spindle for rotation by the spindle in a horizontal plane located within said housing and in spaced relation between said blade and said top wall of said housing, wherein said disc includes an outer portion extending radially outwardly from the inner portion in essentially the same plane as said inner portion, said inner portion of said disc containing a number of downwardly extending wings, wherein the periphery of said disc abuts a number of rollers for rotating an attached string trimmer, each roller with a vertical axis, and each roller located in a cutout in the housing.

2. The invention of claim 1 in combination with the string trimmer, wherein said disc in abutment with said roller provides torque to rotate said string trimmer, said string trimmer mounted near the circumferential periphery of said housing.

3. In a power mower, the combination of a housing having a top wall and a depending skirt joined to said top wall, a source of power for the mower, a vertical spindle operatively connected near its upper end to said source of power and extending downwardly into said housing, a blade fixed to the lower portion of said spindle and rotated thereby in a horizontal plane within the lower portion of said housing, and a disc fixed to an intermediate part of said spindle for rotation by the spindle in a horizontal plane located within said housing and in spaced relation between said blade and said top wall of said housing, wherein said disc includes an outer portion extending radially outwardly from the inner portion in essentially the same plane as the inner portion, said outer portion of said disc containing a number of deflector tabs to propel air and clippings toward said inner portion of the disc, said deflector tabs created by cutouts of said disc extending downwardly from said disc and perpendicular to said disc, said deflector tabs having, in reference to the rotation of the disc, a leading edge portion tangent to the circle formed by the radius of the disc at the point of the leading edge, said deflector tabs having behind the leading edge a curvilinear portion each point of which is closer to the center of the disc than the leading edge portion.

4. The invention of claim 3, wherein the periphery of said disc abuts a number of rollers, each roller with a vertical axis, and each roller located in a cutout in the housing.

5. The invention of claim 4 in combination with a string trimmer, wherein said disc in abutment with said roller provides torque to rotate said string trimmer, said string trimmer mounted adjacent said depending skirt.

6. In a power mower, the combination of a housing having a top wall and a depending skirt joined to said top wall, a source of power for the mower, a vertical spindle operatively connected near its upper end to said source of power and extending downwardly into said housing, a blade fixed to the lower portion of said spindle and rotated thereby in a horizontal plane within the lower portion of said housing, and a disc fixed to an intermediate part of said spindle for rotation by said spindle in a horizontal plane located within said housing and in spaced relation between said blade and said top wall of said housing, wherein said disc includes an outer portion extending radially outwardly from the inner portion in essentially the same plane as said inner portion, said inner portion of said disc containing a number of downwardly extending wings, said outer portion of said disc containing a number of deflector tabs to propel air and clippings toward said inner portion of the disc, the deflector tabs created by cutouts of said disc extending downwardly from said disc and perpendicular to said disc, said deflector tabs having, in reference to the rotation of the disc, a leading edge portion tangent to the circle formed by the radius of the disc at the point of the leading edge, said deflector tabs having behind the leading edge a curvilinear portion each point of which is closer to the center of the disc than the leading edge portion.

7. The invention of claim 6, wherein said inner portion of the disc contains any hole to direct air and clippings downwardly toward an inner portion of the blade, said inner portion of the blade having a leading cutting edge.

8. The invention of claim 6, wherein said disc is tapered at a radial outer edge such that the cross-sectional thickness of said disc is smaller near the periphery of said disc than at all points inward.

9. The invention of claim 6, wherein the periphery of said disc abuts a number of rollers, for rotating an attached string trimmer each roller with a vertical axis, and each roller located in a cutout in the housing.

10. The invention of claim 9 in combination with a string trimmer, wherein said disc in abutment with said roller provides torque to rotate said string trimmer, said string trimmer mounted adjacent said depending skirt.

11. The invention of claim 10, wherein said string trimmer comprises a trimmer shaft pivotably supported relative to said housing; a hub mounted to the lower end of said trimmer shaft, a monofilament line projecting from said hub; a power roller mounted to the upper end of said trimmer shaft, hinge means fixedly connected to a stationary member of said string trimmer whereby said string trimmer can pivot from a rest position to an energized position in which said trimmer hub is powered by said disc, and spring means disposed so as to urge said string trimmer toward its rest position.

* * * * *